(12) United States Patent
Imagawa

(10) Patent No.: US 8,902,337 B2
(45) Date of Patent: Dec. 2, 2014

(54) IMAGING APPARATUS WITH SHADOW ESTIMATION

(75) Inventor: Taro Imagawa, Osaka (JP)

(73) Assignee: Panasonic Corporation, Osaka (JP)

( * ) Notice: Subject to any disclaimer, the term of this patent is extended or adjusted under 35 U.S.C. 154(b) by 76 days.

(21) Appl. No.: 13/613,367

(22) Filed: Sep. 13, 2012

(65) Prior Publication Data

US 2013/0070117 A1 Mar. 21, 2013

(30) Foreign Application Priority Data

Sep. 16, 2011 (JP) ................................. 2011-202640
Aug. 2, 2012 (JP) ................................. 2012-172189

(51) Int. Cl.
*H04N 9/64* (2006.01)
*H04N 5/262* (2006.01)
*G06T 5/00* (2006.01)
*H04N 5/225* (2006.01)
*H04N 5/235* (2006.01)

(52) U.S. Cl.
CPC .............. *G06T 5/008* (2013.01); *H04N 5/2256* (2013.01); *H04N 5/2354* (2013.01); *H04N 5/2355* (2013.01); *G06T 2207/10004* (2013.01)
USPC .......................................... 348/251; 348/239

(58) Field of Classification Search
CPC ............................................. G06T 2207/10144
USPC ................................... 348/239, 251; 382/274
See application file for complete search history.

(56) References Cited

U.S. PATENT DOCUMENTS

| 7,920,179 B2 * | 4/2011 | Thorn | 348/239 |
| 8,467,108 B2 * | 6/2013 | Shimatani | 358/461 |
| 2010/0194919 A1 * | 8/2010 | Ishii et al. | 348/224.1 |

OTHER PUBLICATIONS

Shirai et al, "Color and Shadow Replacing of Flash and No-Flash Photos to Create Noiseless Images", IEICE Transaction (Japanese Edition) vol. J94-A, No. 4, pp. 275-284, 2011 (translation to be provided) (cited on p. 1 of the specification).
Shirai et al, "Color and Shadow Replacing of Flash and No-Flash Photos to Create Noiseless Images", IEICE Transaction (Japanese Edition) vol. J94-A, No. 4, pp. 275-284, 2011 (Previously submitted in IDS filed on Sep. 13, 2012; Partial English Translation now available and submitted).

* cited by examiner

*Primary Examiner* — Joel Fosselman
(74) *Attorney, Agent, or Firm* — Renner, Otto, Boisselle & Sklar, LLP

(57) ABSTRACT

An imaging apparatus 100 includes a light emitting part 103 configured to irradiate a subject(s) with light; an imaging part 101 configured to image the subject(s); the imaging part 101, a distance information acquiring part 102, and a distance calculating part 203 each configured to acquire a distance to the subject(s); a shadow estimating part 204 configured to estimate, based on the distance acquired by the imaging part 101, the distance information acquiring part 102, and the distance calculating part 203, a shadow(s) generated by the light from the light emitting part 103 in an image shot by using the imaging part 101; and a shadow correcting part 205 configured to correct the shadow(s) estimated by the shadow estimating part 204 such that the shadow(s) is lightened.

7 Claims, 8 Drawing Sheets

IMAGING APPARATUS WITH SHADOW ESTIMATION

CROSS-REFERENCE TO RELATED APPLICATION

This application claims priority to Japanese Patent Application No. 2011-202640 filed on Sep. 16, 2011 and Japanese Patent Application No. 2012-172189 filed on Aug. 2, 2012, the disclosure of which including the specification, the drawings, and the claims is hereby incorporated by reference in its entirety.

BACKGROUND

The present disclosure relates to an imaging apparatus including a light emitting part configured to irradiate a subject (s) with light.

An imaging apparatus disclosed in Keiichiro SHIRAI, Masaaki IKEHARA, and Masayuki OKAMOTO, Color and Shadow Replacing of Flash and No-Flash Photos to Create Noiseless Images, IEICE Transaction (Japanese Edition), Vol. J94-A, No. 4, pp. 275-284, 2011 is configured to correct a shadow(s) of a subject(s) generated by external light emission (e.g., flash light emission and auxiliary light emission). Specifically, the imaging apparatus shoots the same subject (s) a total of two times, i.e., shoots the subject(s) with the external light emission and without the external light emission. Color components of an image (a shadow(s) is generated mainly due to a change in luminance components of emitted light) acquired by the shooting with the external light emission and luminance components of an image acquired by the shooting without the external light emission are synthesized into a single image, thereby generating an image which does not contain the shadow(s) generated by the external light emission.

The present disclosure provides an imaging apparatus configured to easily acquire an image for which a shadow(s) generated by external light emission is reduced.

SUMMARY

An imaging apparatus of the present disclosure includes a light emitting part configured to irradiate a subject with light; an imaging part configured to image the subject; a distance acquiring part configured to acquire a distance to the subject; a shadow estimating part configured to estimate, based on the distance acquired by the distance acquiring part, a shadow generated by the light from the light emitting part in an image shot by the imaging part; and a shadow correcting part configured to correct the shadow estimated by the shadow estimating part such that the shadow is lightened. The definition of "to correct the shadow estimated by the shadow estimating part such that the shadow is lightened" is that a shadow becomes less conspicuous as compared to a shadow before the correction. Such a definition includes not only the state in which a blurry shadow remains after the correction, but also the state in which a shadow is completely removed after the correction.

DETAILED DESCRIPTION

Embodiments are described in detail below with reference to the attached drawings. However, unnecessarily detailed description may be omitted. For example, detailed description of well known techniques or description of the substantially same elements may be omitted. Such omission is intended to prevent the following description from being unnecessarily redundant and to help those skilled in the art easily understand it.

Inventor(s) provides the following description and the attached drawings to enable those skilled in the art to fully understand the present disclosure. Thus, the description and the drawings are not intended to limit the scope of the subject matter defined in the claims.

[1. Configuration of Imaging Apparatus]
[1-1. Schematic Configuration]

Figure 1:
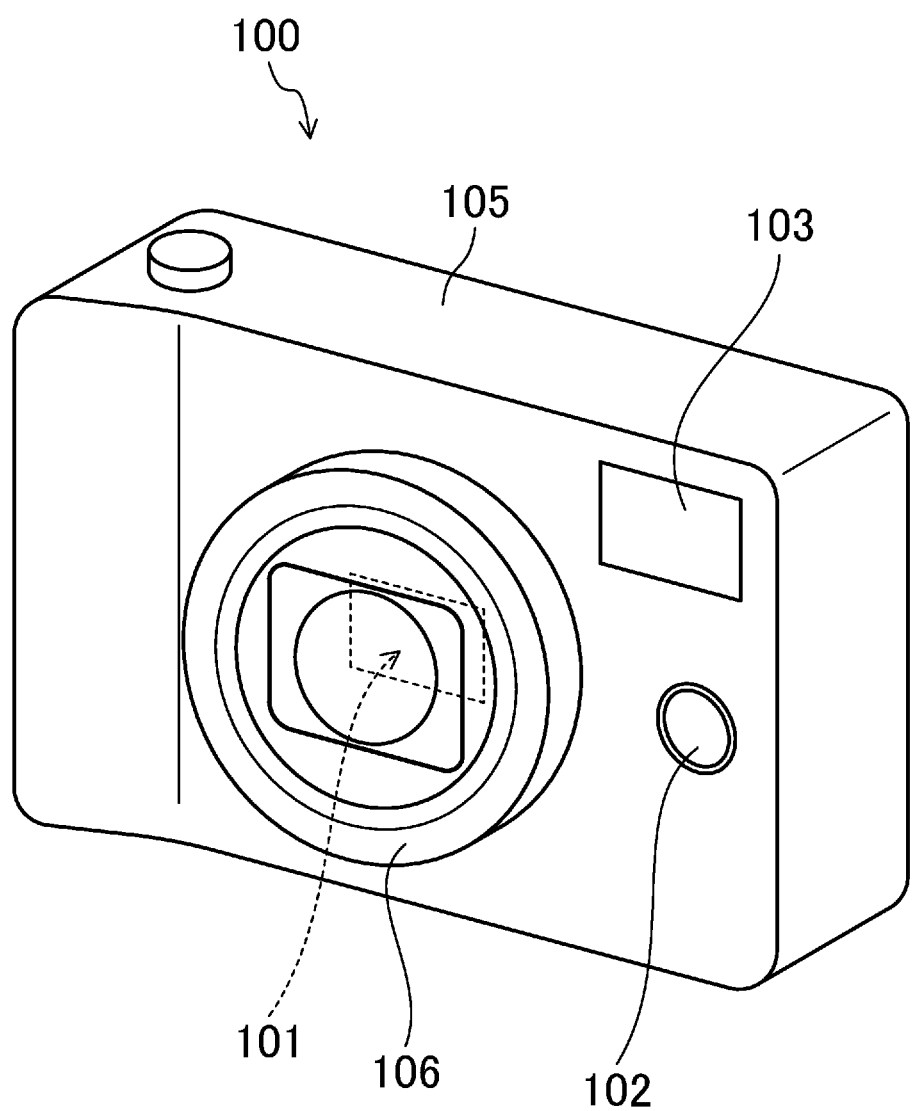
FIG. 1 is a perspective view illustrating an external appearance of an imaging apparatus.
Figure 2:
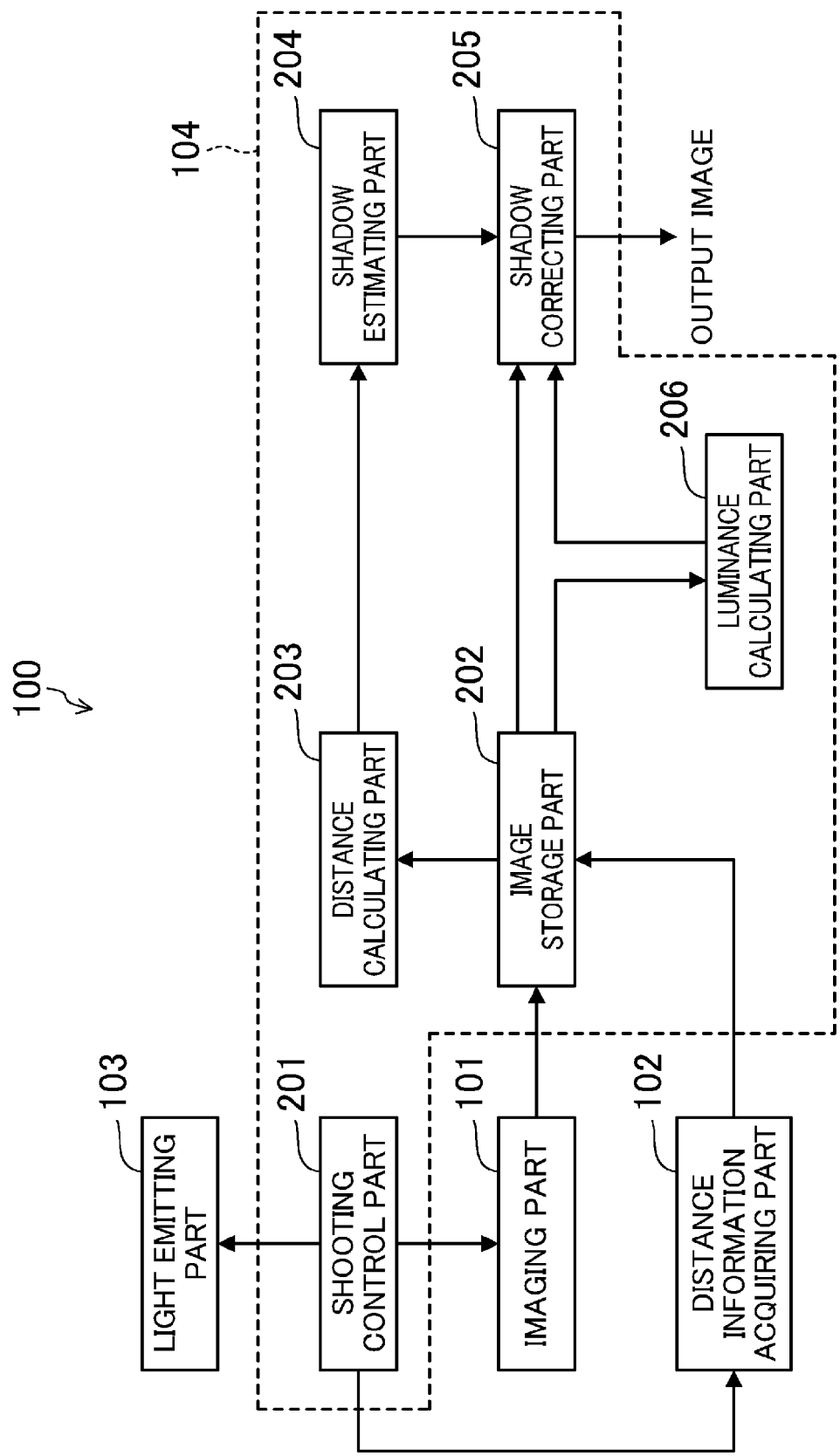
FIG. 2 is a block diagram illustrating a configuration of the imaging apparatus.

FIG. 1 is a perspective view illustrating an external appearance of an imaging apparatus 100, and FIG. 2 is a block diagram illustrating a main configuration of the imaging apparatus 100.

The imaging apparatus 100 includes a main body 105, an imaging part 101 provided inside the main body 105 and configured to image a subject(s), a distance information acquiring part 102 configured to acquire information on a distance from the imaging apparatus 100 to a subject(s), a light emitting part 103 configured to emit light toward a subject(s), and a control part 104 (illustrated only in FIG. 2) configured to control the foregoing parts. The imaging apparatus 100 is a so-called "digital camera."

The main body 105 includes a lens barrel 106 at the substantially center on a surface of the main body 105 on a side closer to a subject(s). The lens barrel 106 includes an imaging optical system (not shown in the figure). The imaging optical system is configured to form a subject image on the imaging part 101.

The imaging part 101 images a subject(s) and acquires a subject image. The imaging part 101 is an image sensor such as a CCD image sensor or a CMOS image sensor. The imaging apparatus 100 shoots a subject(s) by using the imaging part 101.

The distance information acquiring part 102 acquires the information on the distance to the subject(s). The distance information acquiring part 102 is an image sensor such as a CCD image sensor or a CMOS image sensor. That is, the distance information acquiring part 102 images a subject(s) and acquires a subject image. The distance information acquiring part 102 is provided at a position different from that of the imaging part 101. Specifically, the distance information acquiring part 102 is provided at the left of the lens barrel 106 when facing a subject(s) in an optical axis direction. Thus, there is parallax between an image shot by the distance information acquiring part 102 and an image shot by the imaging part 101. Although details will be described later, the images having parallax therebetween are images referred when the distance to a subject(s) is calculated, and are the information on the distance from the imaging apparatus 100 to the subject (s). Note that the same type of the image sensor may be used for the distance information acquiring part 102 and the imaging part 101, or different types of the image sensor may be used for each of the distance information acquiring part 102 and the imaging part 101. The number of pixels of the distance information acquiring part 102 may be the same as that of the imaging part 101, or may be different from that of the imaging part 101.

Unless otherwise specified, an image shot by the imaging part 101 is hereinafter referred to as a "shot image," and an image shot by the distance information acquiring part 102 is hereinafter referred to as a "reference image."

The light emitting part 103 emits light toward a subject(s) upon shooting of the subject(s) by using the imaging part 101. The light emitting part 103 is provided in a corner part of the main body 105, and is specifically provided at the upper left of the main body 105 when facing a subject(s) in the optical axis direction. The light emitting part 103 is configured such that a light emission amount is adjustable.

[1-2. Configuration of Control Part]

The control part 104 includes a shooting control part 201, an image storage part 202, a distance calculating part 203, a shadow estimating part 204, a shadow correcting part 205, and a luminance calculating part 206. The control part 104 may be a microcomputer. Note that the control part 104 may be implemented by hard-wired logic. If the control part 104 is implemented by the hard-wired logic, it is effective for improving a processing speed. The control part 104 may be configured by a single element, or may be physically configured by a plurality of elements. If the control part 104 is configured by the plurality of elements, each control described in the claims may be implemented by different elements. In such a case, it can be considered that the plurality of elements form the single control part 104. Alternatively, the control part 104 and a member having another function may be configured by a single element. Briefly speaking, as long as the control part 104 controls the imaging apparatus 100, any physical configurations are applicable to the control part 104.

The shooting control part 201 is responsible for a main control of the imaging apparatus 100. For example, the shooting control part 201 controls, upon shooting, operations of the imaging part 101, the distance information acquiring part 102, and the light emitting part 103. That is, the shooting control part 201 performs the following: controlling the imaging part 101 to image a subject(s); performing photometry based on output from the imaging part 101; controlling the distance information acquiring part 102 to image a subject(s) (i.e., to acquire the information on the distance); and operating the light emitting part 103.

One of the controls performed by the shooting control part 201 is a light emission control. The light emitting part 103 is settable to an automatic mode or a manual mode. Specifically, when the light emitting part 103 is set to the automatic mode, the shooting control part 201 measures the light intensity of a subject(s) and determines, based on the light intensity, whether or not the shooting control part 201 operates the light emitting part 103. When the light intensity is equal to or less than a predetermined threshold, the shooting control part 201 operates the light emitting part 103 upon shooting. On the other hand, when the light intensity is greater than the threshold, the shooting control part 201 does not operate the light emitting part 103 upon shooting. Note that an additional sensor for the photometry may be provided, and the shooting control part 201 may determines, based on output from the sensor, whether or not the shooting control part 201 operates the light emitting part 103. The manual mode includes a forcible light emission mode and a light emission stop mode. When the light emitting part 103 is set to the forcible light emission mode, the shooting control part 201 operates the light emitting part 103 every time a subject(s) is shot. On the other hand, when the light emitting part 103 is set to the light emission stop mode, the shooting control part 201 does not operate the light emitting part 103 every time a subject(s) is shot. When the shooting control part 201 operates the light emitting part 103 in the automatic mode or the manual mode, the shooting control part 201 adjusts the light emission amount of the light emitting part 103 depending on the light intensity of subject(s) and a shutter speed. That is, when the light intensity of subject(s) is low, the shooting control part 201 increases the light emission amount of the light emitting part 103. When the light intensity of subject(s) is high, the shooting control part 201 decreases the light emission amount of the light emitting part 103. In addition, when the shutter speed is high, the shooting control part 201 increases the light emission amount of the light emitting part 103. When the shutter speed is low, the shooting control part 201 decreases the light emission amount of the light emitting part 103.

The image storage part 202 is configured to store an image (s) shot by the imaging part 101. The image storage part 202 may be a memory. In addition, the image storage part 202 is also configured to store an image(s) shot by the distance information acquiring part 102.

The distance calculating part 203 is configured to calculate, based on a shot image of the imaging part 101 and a reference image of the distance information acquiring part 102, a distance from the imaging apparatus 100 to part of a subject(s) corresponding to each pixel of the shot image. That is, the distance calculating part 203 calculates the distance to a subject(s) based on the parallax between the shot image and the reference image. Note that, if the reference image and the shot image are different from each other in resolution, a bicubic interpolation or a bilinear interpolation is used to calculate the distance to part of the subject(s) corresponding to each pixel. The distance calculating part 203 outputs the calculated distances to the shadow estimating part 204. Although the shot image and the reference image stored in the image storage part 202 are input to the distance calculating part 203, a shot image and a reference image may be directly input from the imaging part 101 and the distance information acquiring part 102 to the distance calculating part 203.

The imaging part 101, the distance information acquiring part 102, and the distance calculating part 203 are examples of a distance acquiring part.

The shadow estimating part 204 is configured to estimate, based on a position relationship between the imaging part 101 and the light emitting part 103 and the distances calculated by the distance calculating part 203, a shadow(s) generated in a shot image by the light emission of the light emitting part 103. The position relationship between the imaging part 101 and the light emitting part 103 are determined in advance, and is stored in a storage part which is not shown in the figure. A method for estimating a shadow(s) will be described later. The shadow estimating part 204 outputs the estimated shadow(s) (e.g., position information of a pixel(s) corresponding to the shadow(s)) to the shadow correcting part 205.

The luminance calculating part 206 is configured to calculate the luminance of a shot image. Specifically, the luminance calculating part 206 reads out a shot image stored in the image storage part 202, and calculates the luminance of each pixel in the shot image. The luminance calculating part 206 outputs the calculated luminance to the shadow correcting part 205.

The shadow correcting part 205 is configured to perform image correction for lightening a shadow(s) (i.e., reducing the shadow(s)) estimated by the shadow estimating part 204. A method for correcting a shadow(s) will be described later. The shadow correcting part 205 outputs a corrected image.

[2. Shooting Steps]

Figure 3:
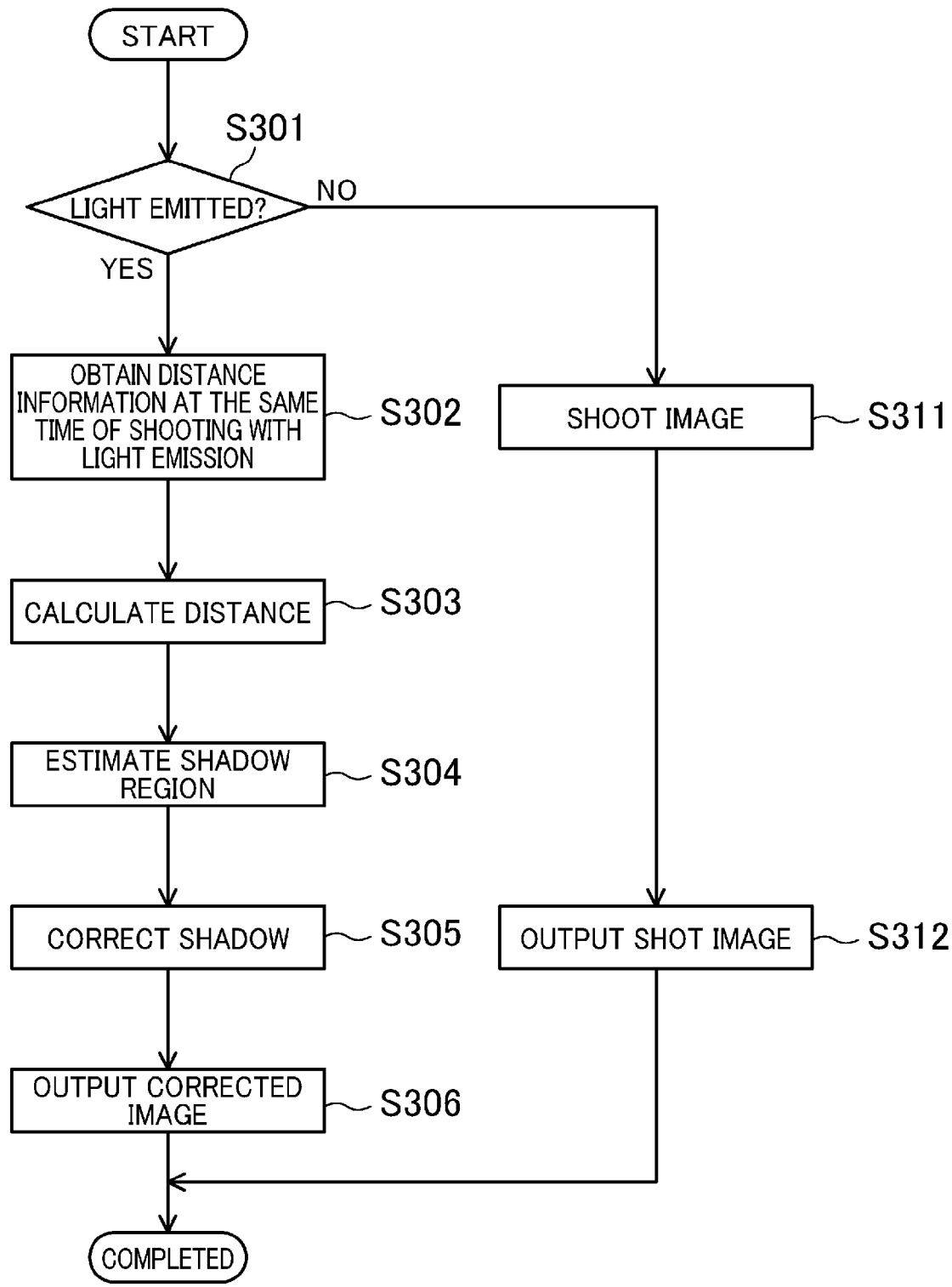
FIG. 3 is a flow chart illustrating processing steps in the imaging apparatus.

FIG. 3 is a flow chart illustrating steps for a shooting process by the control part 104.

First, the control part 104 determines, at step S301, whether or not external light emission is to be used. Specifically, the control part 104 first determines whether the light emitting part 103 is set to the automatic mode or the manual mode. Then, in the automatic mode, the control part 104 determines, based on photometry results obtained by the imaging part 101, whether or not the control part 104 operates the light emitting part 103. In the manual mode, the control part 104 determines whether or not the light emitting part 103 is set to the forcible light emission mode or the light emission stop mode. Regardless of whether the light emitting part 103 is set to the automatic mode or the manual mode, the process proceeds to step S302 if a subject(s) is shot with the light emitting part 103 being operated (if "Yes"), or the process proceeds to step S311 if the subject(s) is shot without the light emitting part 103 being operated (if "No").

At step S302, the control part 104 shoots the subject(s) by using the imaging part 101 with the light emitting part 103 being operated. At the same time, the control part 104 controls the distance information acquiring part 102 to acquire the distance information (in present embodiment, controls the distance information acquiring part 102 to shoot the subject (s)).

At step S303, the control part 104 calculates, based on the shot image of the imaging part 101 and the reference image of the distance information acquiring part 102, a distance from the imaging apparatus 100 to part of a subject(s) corresponding to each pixel of the shot image.

At step S304, the control part 104 estimates, based on the calculated distances, a shadow(s) generated in the shot image by the light emission of the light emitting part 103.

At step S305, the control part 104 performs the image correction to lighten the estimated shadow(s). Subsequently, at step S306, the control part 104 outputs the corrected image.

On the other hand, if the external light emission is not used ("No" at step S301), the control part 104 shoots, at step S311, the subject(s) by using the imaging part 101 without the light emitting part 103 being operated. Subsequently, at step S312, the control part 104 outputs the shot image.

[3. Method for Correcting Shadow]

Next, the method for correcting a shadow(s) will be described.

[3-1. Generation of Shadow]

Figure 4:
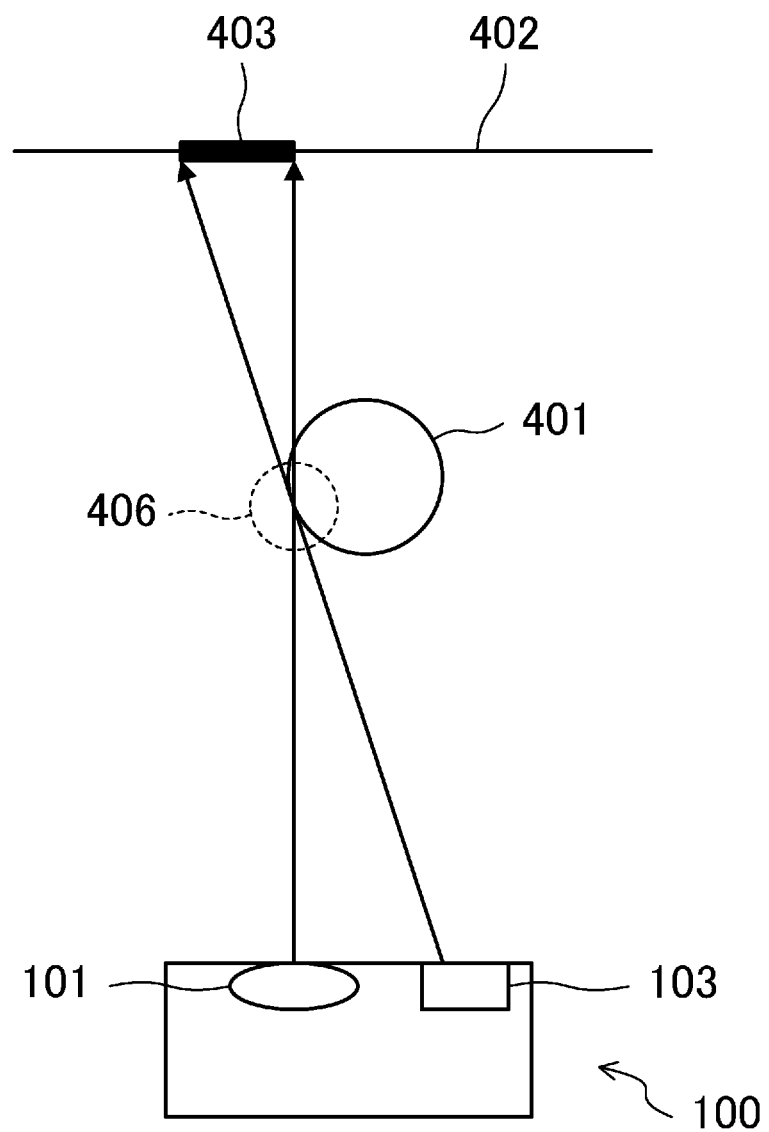
FIG. 4 is a view illustrating an example of a position relationship among an imaging part, a light emitting part, and subjects.

First, a shadow(s) generated by the external light emission will be described with reference to FIG. 4. FIG. 4 illustrates an example of the position relationship among the imaging part 101, the light emitting part 103, and subjects. For the sake of easy description of the position relationship, FIG. 4 illustrates the position relationship as viewed in the horizontal plane. In the example illustrated in FIG. 4, a spherical subject 401 is positioned closer to the imaging apparatus 100 than a flat subject 402 is.

When the subject(s) is shot in the example illustrated in FIG. 4, an image of the spherical subject 401 is shot with the flat subject 402 in the background. In such a state, when the light emitting part 103 emits light, a shadow of the spherical subject 401 is generated on part of the flat subject 402 and part of the spherical subject 401. The shadow of the spherical subject 401 is generated at a position of the flat subject 402 where the spherical subject 401 is projected in a direction along a line connecting the light emitting part 103 and the spherical subject 401. If the imaging part 101 is at the same position as that of the light emitting part 103, no shadow is visible from the imaging part 101, and a shadow 403 is not shot. However, referring to FIG. 4, since the positions of the imaging part 101 and the light emitting part 103 are displaced from each other in the imaging apparatus 100, the shadow 403 is visible from the imaging part 101. That is, the shadow 403 is shot by the imaging part 101.

[3-2. Estimation of Shadow]

Figure 5:
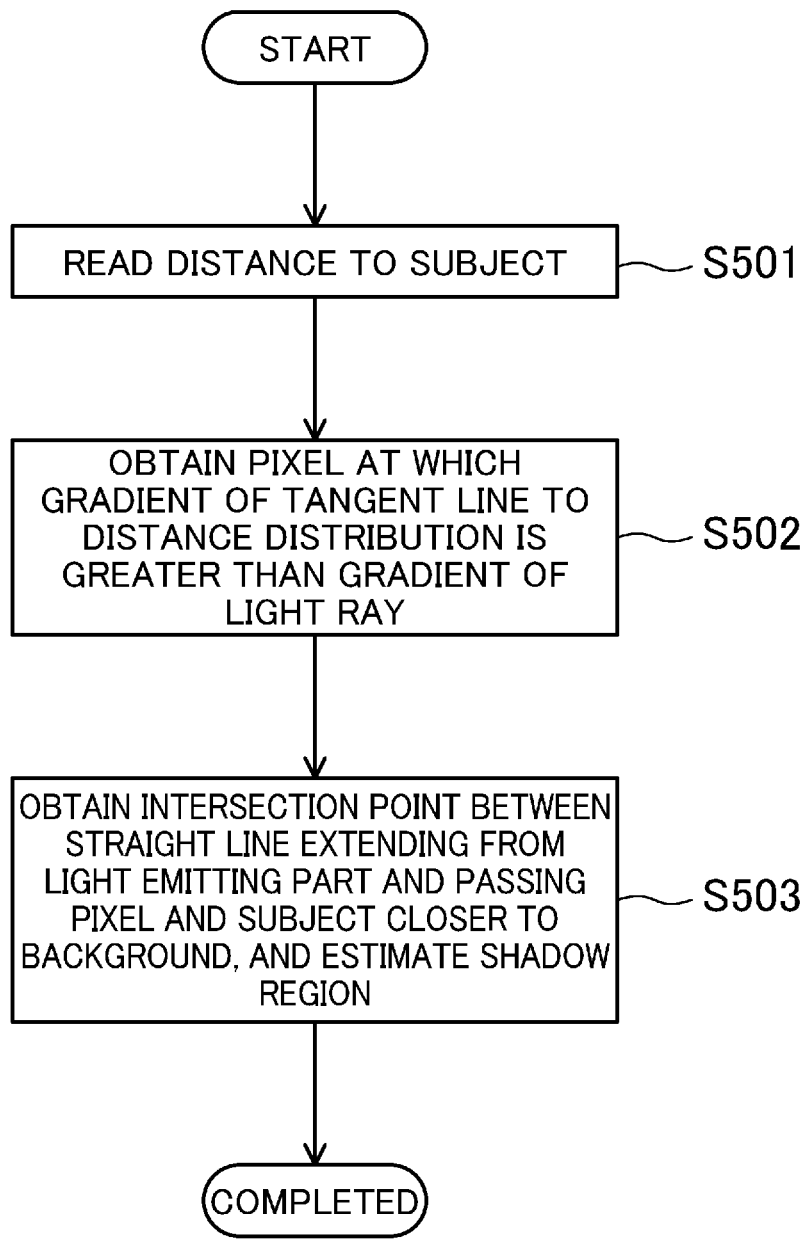
FIG. 5 is a flow chart illustrating steps for shadow estimation.

Next, steps for estimating the shadow 403 in the shot image are described with reference to FIG. 5. FIG. 5 is a flow chart illustrating the steps for shadow estimation.

Figure 6:
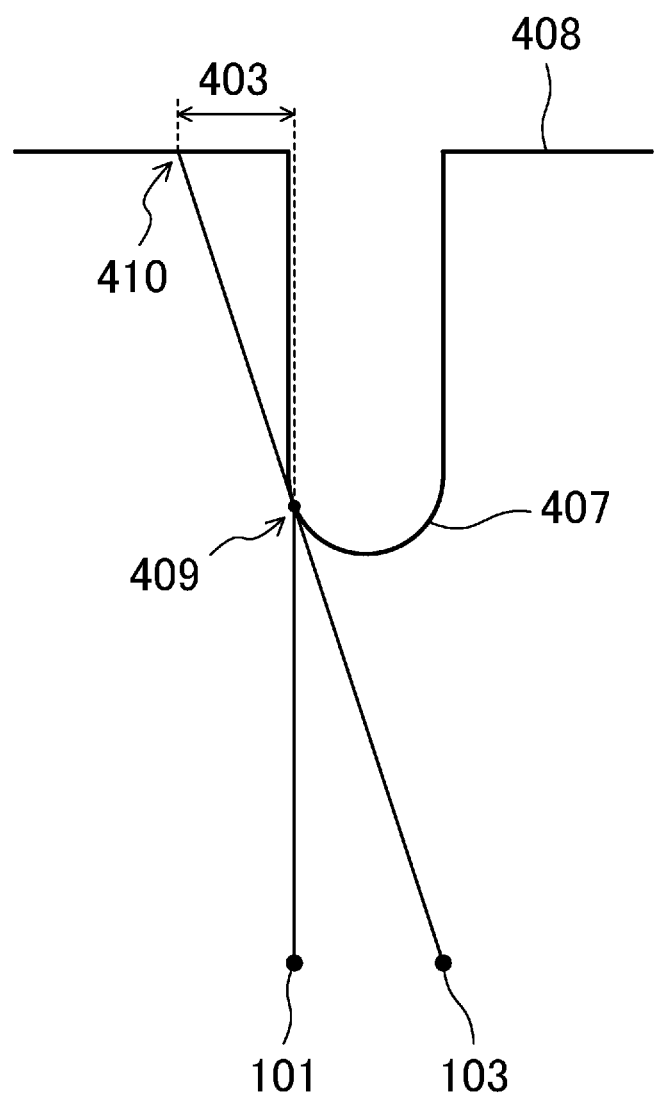
FIG. 6 is a view illustrating an example of a distance to a subject calculated by a distance calculating part.

At step S501, the distances to the subject(s) calculated by the distance calculating part 203 are input to the shadow estimating part 204. In the example illustrated in FIG. 4, the distance to the subject(s) calculated for each pixel by the distance calculating part 203 is as illustrated in FIG. 6. FIG. 6 illustrates a distribution of the distance (distance for each of the pixels arranged in the horizontal direction at a predetermined height position) from the imaging apparatus 100 to the subject(s). The imaging apparatus 100 is positioned on the lower side as viewed in FIG. 6, and the distance from the imaging apparatus 100 is increased toward the upper side as viewed in FIG. 6. In FIG. 6, a downwardly protruding part 407 represents a distance to the spherical subject 401, and a flat part 408 represents a distance to the flat subject 402. Note that the distance distribution is the distribution of the distance to the subject(s) on a horizontal lines (i.e., at the predetermined height position) in a two-dimensional image. That is, the distance to the subject(s) at each height position is calculated so as to cover all height positions, thereby calculating the distance distribution in the entirety of the shot image.

Next, at step S502, the shadow estimating part 204 compares the gradient (the amount of a change in distance/the amount of a change in the horizontal direction) of a tangent line to the distance distribution (line illustrated in FIG. 6) at each point (each pixel) with the gradient of a light ray (i.e., a straight line connecting each point (each pixel) and the light emitting part 103) from the light emitting part 103 to each point (each pixel). Then, the shadow estimating part 204 obtains a transition point (pixel) at which the gradient of the tangent line becomes greater than the gradient of the light ray. The "gradient" is the ratio of the amount of the change in distance to the amount of the change in the horizontal direction (Gradient=Amount of Change in Distance/Amount of Change in Horizontal Direction). Specifically, the shadow estimating part 204 compares, from one end to the other end of the distance distribution, the gradient of the tangent line and the gradient of the light ray at each point. Then, the shadow estimating part 204 obtains a point (pixel) at which the state in which the gradient of the tangent line is less than the gradient of the light ray is changed to the state in which the gradient of the tangent line is greater than the gradient of the light ray. In FIG. 6, the gradient of the tangent line becomes greater than the gradient of the light ray at a point (pixel) indicated by an arrow 409. The point (pixel) indicated by the arrow 409 corresponds to part where a light ray from the light emitting part 103 and the spherical subject 401 contact each other as indicated by a reference numeral 406 in FIG. 4. The point (pixel) indicated by the arrow 409 in FIG. 6 is one end of a boundary of the shadow 403.

Subsequently, at step S503, the shadow estimating part 204 obtains an intersection point between a straight line extending from the light emitting part 103 and passing the point (pixel) indicated by the arrow 409 and a subject positioned closer to the background than the point (pixel) indicated by the arrow 409 is. In FIG. 6, the straight line intersects the flat part 408 corresponding to the flat subject 402. A point (pixel) indicated by an arrow 410 and corresponding to the intersection point on the flat part 408 is the other end of the boundary of the shadow 403.

The shadow estimating part 204 estimates a region between the point (pixel) indicated by the arrow 409 and the point (pixel) indicated by the arrow 410 as the shadow 403. The shadow estimating part 204 two-dimensionally estimates the shadow 403 in the shot image by performing the processing at steps S502, S503 for the distribution of the distance to the subject(s) at each height position.

Figure 7:
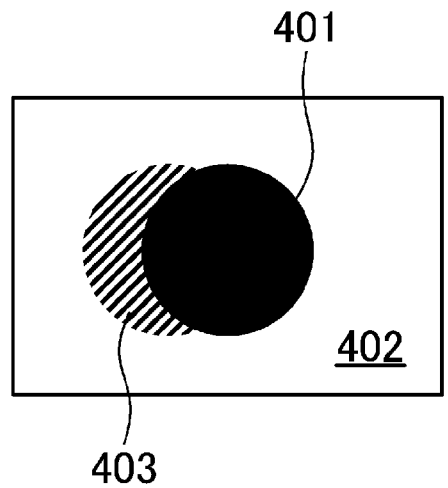
FIG. 7 is a view illustrating a shot image containing a shadow.
Figure 8:
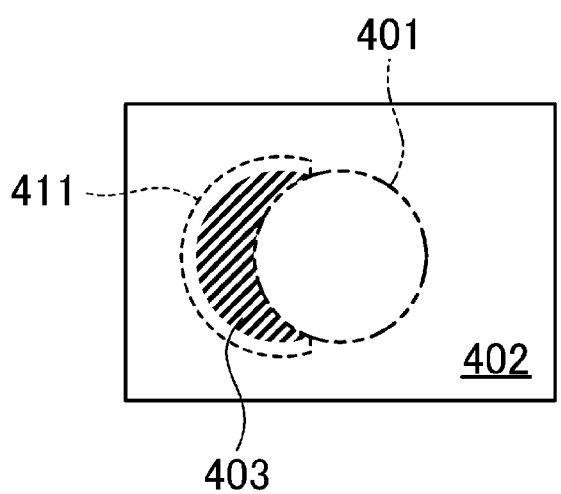
FIG. 8 is a view illustrating an estimated shadow.
Figure 9:
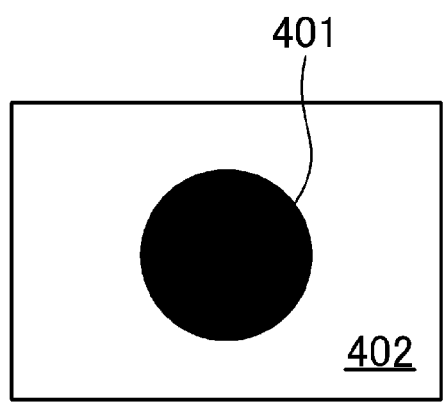
FIG. 9 is a view illustrating a corrected image.

FIG. 7 illustrates the shot image in the example illustrated in FIG. 4, and FIG. 8 illustrates the shadow estimated in the shot image. In addition, FIG. 9 illustrates the corrected image in which the shadow is corrected. In the shot image illustrated in FIG. 7, the image of the subject 401 is shot, and the image of the shadow 403 generated by the external light emission is shot on the background of the subject 401. When the shadow estimating part 204 estimates the shadow in the shot image by the foregoing method, the shadow 403 which is in such a shape that part of a circle is cut out by another circle is estimated as illustrated in FIG. 8.

[3-3. Correction of Shadow]

Next, the method for correcting a shadow(s) will be described.

The shadow correcting part 205 is configured to correct the shadow 403 by correcting the luminance of the shadow 403. Specifically, the shadow correcting part 205 corrects the luminance of the shadow 403 by using luminance in a region outside the shadow 403. For example, the shadow correcting part 205 obtains an average value for luminance (i.e., average luminance) in a band region 411 adjacent to the shadow 403 generated on the flat subject 402. The band region 411 is a band-shaped region having a width corresponding to the predetermined number of pixels and extending along the boundary of the shadow 403. The number of pixels corresponding to the width of the band-shaped region can be arbitrarily set. The shadow correcting part 205 replaces the luminance of the shadow 403 with the average value for luminance in the band region 411. As a result, referring to FIG. 9, the corrected image from which the shadow is removed can be acquired.

Note that part of the shadow 403 generated on the spherical subject 401 is corrected so as to have an average value for luminance in a band region of the spherical subject 401 which is adjacent to the shadow 403 and has a predetermined range. However, since the part of the shadow 403 generated on the spherical subject 401 is minute, such a part may not be corrected, or may be corrected so as to have an average value for luminance in the band region 411.

The shadow correcting part 205 correct a shadow(s) depending on the distance from the imaging apparatus 100 to a subject(s). Specifically, the shadow correcting part 205 corrects a shadow(s) when it is determined based on the calculation results of the distance calculating part 203 that the distance from the imaging apparatus 100 to a subject(s) is equal to or less than a predetermined threshold, and does not correct a shadow(s) when the distance exceeds the threshold. The threshold may be set to a distance at which an influence of a shadow(s) generated by light from the light emitting part 103 is small. That is, even in a single shot image, a shadow(s) is not corrected for a subject(s) far from the imaging apparatus 100, and a shadow(s) is corrected for a subject(s) close to the imaging apparatus 100. For example, when the distance to the flat subject 402 exceeds the threshold, a shadow(s) is not corrected. Thus, the shadow correction can be skipped for a subject(s) on which the small influence of light from the light emitting part 103 is provided, thereby reducing a processing amount. As a result, a time to acquire an image can be shortened, and power consumption of an arithmetic circuit can be cut down.

Note that the threshold may be changed depending on the light emission amount of the light emitting part 103. That is, the threshold may be increased when the light emission amount of the light emitting part 103 is large, and the threshold may be decreased when the light emission amount of the light emitting part 103 is small. In other words, the distance at which light from the light emitting part 103 influences a subject(s) is changed depending on the light emission amount of the light emitting part 103. Thus, since the threshold is changed depending on the light emission amount, it can be determined, according to the actual need of the shadow correction, whether or not a shadow(s) is corrected.

Before a shadow(s) is estimated, it may be determined, depending on the distance, whether or not the shadow(s) is corrected. Alternatively, after a shadow(s) is estimated, it may be determined, depending on the distance, whether or not the shadow(s) is corrected.

The shadow correcting part 205 corrects a shadow(s) depending on the light emission amount of the light emitting part 103. Specifically, the shadow correcting part 205 corrects a shadow(s) when the light emission amount of the light emitting part 103 is equal to or greater than a predetermined threshold, and does not correct a shadow(s) when the light emission amount falls below the threshold. The threshold may be set to the light emission amount at which the influence of the shadow(s) generated by light from the light emitting part 103 is small. Thus, the shadow correction can be skipped if the light emission amount of the light emitting part 103 is small and therefore the influence of the shadow(s) generated by light from the light emitting part 103 is small. Consequently, the processing amount can be reduced. As a result, the time to acquire an image can be shortened, and the power consumption of the arithmetic circuit can be cut down.

[4. Advantages]

As described above, in the present embodiment, the imaging apparatus 100 includes the following: the light emitting part 103 configured to irradiate a subject(s) with light; the imaging part 101 configured to image a subject(s); the imaging part 101, the distance information acquiring part 102, and the distance calculating part 203 each configured to acquire the distance to a subject(s); the shadow estimating part 204 configured to estimate, based on the distances calculated by the distance calculating part 203, the shadow 403 generated by light from the light emitting part 103 in an image shot by using the imaging part 101; and the shadow correcting part 205 configured to correct the shadow 403 estimated by the shadow estimating part 204 to lighten the shadow 403.

According to the foregoing configuration, since the shadow 403 can be corrected by one-time shooting, an image in which a shadow(s) generated by the external light emission is reduced can be easily acquired.

Figure 10:
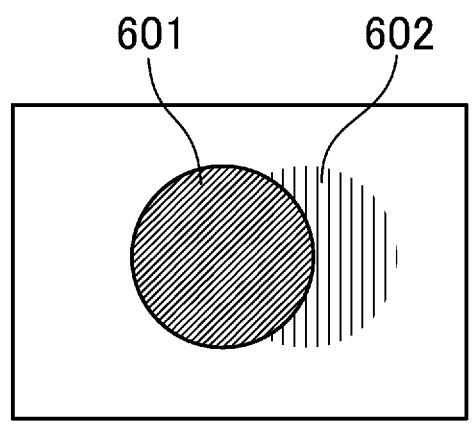
FIG. 10 is a view illustrating an image acquired when a shadow is corrected by shooting a subject(s) two times.

The foregoing configuration is particularly effective when a moving subject is shot. For example, in the method in which a subject(s) is shot a total of two times, i.e., is shot with the external light emission and without the external light emission are performed, and color components of an image acquired by the shooting with the external light emission and luminance components of an image acquired by the shooting without the external light emission are synthesized into a single image, if the subject 401 moves toward the right as viewed in FIG. 7, the position of the subject is different between the first shooting and the second shooting. Thus, referring to FIG. 10, the position of an image 601 with the color components and the position of an image 602 with the luminance components are separated in a moving direction of the subject, and an unnaturally-looking image is formed.

On the other hand, according to the imaging apparatus 100, since a shadow(s) can be corrected by one-time shooting, acquisition of a moving subject image in which an image with color components and an image with luminance components are displaced from each other can be prevented.

The shadow correcting part 205 corrects at least the luminance of the shadow 403.

A major difference between the shadow 403 and other part of an image is the luminance. Thus, a shadow is corrected by luminance correction.

The shadow correcting part 205 corrects the luminance of the shadow 403 based on the luminance in the band region 411 adjacent to the shadow 403 generated on the flat subject 402.

According to the foregoing configuration, the luminance of the shadow 403 can be corrected to natural luminance. That is, original luminance in part corresponding to the shadow 403 is expected to be approximate to the luminance in the band region 411 adjacent to the shadow 403 generated on the flat subject 402. Thus, by using the luminance in the adjacent band region 411, the luminance of the shadow 403 can be corrected to the natural luminance.

The shadow correcting part 205 changes the luminance of the shadow 403 to the average luminance in the band region 411 which is adjacent to the shadow 403 generated on the flat subject 402 and which has the predetermined range.

According to the foregoing configuration, the luminance of the shadow 403 is not corrected by using luminance of a pixel in an adjacent region, but is corrected to the average luminance in the band region 411 having the predetermined range. Thus, the luminance of the shadow 403 can be corrected to luminance which is substantially approximate to the luminance in the adjacent band region 411.

The shadow correcting part 205 corrects the shadow 403 when the distance to a subject(s) obtained by the imaging part 101, the distance information acquiring part 102, and the distance calculating part 203 is equal to or less than the predetermined threshold, and does not correct the shadow 403 when the distance exceeds the threshold.

According to the foregoing configuration, a shadow(s) is not corrected for a subject(s) which is not susceptible to the light emission of the light emitting part 103 or a subject(s) which is positioned far enough that, even if a shadow(s) is generated by the light emission of the light emitting part 103, such a shadow(s) is inconspicuous. As a result, useless processing can be skipped, thereby shortening a processing time.

The light emitting part 103 is configured such that the light emission amount is adjustable. The shadow correcting part 205 corrects the shadow 403 when the light emission amount of the light emitting part 103 is equal to or greater than the predetermined threshold, and does not correct the shadow 403 when the light emission amount falls below the threshold.

According to the foregoing configuration, a shadow(s) is not correct if a subject(s) is not susceptible to the light emission of the light emitting part 103, or the light emission amount is small enough that, even if a shadow(s) is generated by the light emission of the light emitting part 103, such a shadow(s) is inconspicuous. As a result, the useless processing can be skipped, thereby shortening the processing time.

Other Embodiment

As described above, the embodiment have been described as example techniques disclosed in the present application. However, the techniques according to the present disclosure are not limited to the embodiment, but are also applicable to those where modifications, substitutions, additions, and omissions are made. In addition, elements described in the embodiment may be combined to provide a different embodiment.

Other embodiment will be described below as examples.

The imaging apparatus 100 corrects a shadow(s) for a still image, but the present disclosure is not limited to the still image. That is, a shadow(s) is corrected for each of frame images of a moving image, and therefore the shadow(s) can be corrected for the moving image.

In the foregoing embodiment, the light emitting part 103 is built in the main body 105. However, the present disclosure is not limited to the foregoing. As long as the light emitting part irradiates a subject(s) with light, any configurations can be employed for the light emitting part.

In the foregoing embodiment, the imaging part 101, the distance information acquiring part 102, and the distance calculating part 203 form the distance acquiring part. However, the present disclosure is not limited to the foregoing. A time-of-flight (TOF) sensor may be used as the distance information acquiring part 102 which is the distance acquiring part. If the TOF sensor is used, the distance to a subject(s) can be directly measured. That is, the process for calculating the distance to a subject(s) based on the parallax between the shot image and the reference image in the foregoing embodiment can be omitted.

In the foregoing embodiment, the distance information acquiring part 102 is used only for calculating the distance to a subject(s), but the present disclosure is not limited to the foregoing. In an imaging apparatus (e.g., a 3D camera) including a plurality of imaging parts and shooting stereo images (shooting images with multiple lenses), one of the imaging parts may be used as the distance information acquiring part 102. That is, one of the imaging parts is normally used for the shooting stereo images, and is, upon the shadow correction, used as the distance information acquiring part 102 configured to acquire a reference image having parallax with respect to a shot image. That is, since the 3D camera can shoot two images having parallax therebetween by one-time shooting, a shadow(s) can be easily corrected. According to the foregoing configuration, a member only for the shadow correction, such as the TOF sensor, is not necessarily provided, and therefore the number of components can be reduced. In addition, an image acquired by one of the imaging parts is used for both of the shadow correction and the shooting of stereo images, thereby reducing an influence of a shadow(s) generated by a light emitting part upon the shooting of stereo images.

The method for correcting a shadow(s) has been set forth merely for the purpose of an example in nature, and different methods may be employed.

For example, in the foregoing embodiment, the entirety of the shadow 403 is corrected to the luminance in the band region 411, but luminance for reference is not limited to the luminance in the band region 411. That is, as long as the luminance of the shadow 403 can be approximated to the original luminance in part corresponding to the shadow 403, luminance in any part can be used as the luminance referred upon the correction of the luminance of the shadow 403. For example, the shape of the band region 411 is not limited to the foregoing shape.

In the foregoing embodiment, the entirety of the shadow 403 is corrected to a single value, i.e., the average luminance in the band region 411. However, the present disclosure is not limited to such a configuration. The shadow 403 may be corrected to, e.g., different luminance depending on height positions. Specifically, all of pixels corresponding to the shadow 403 at a certain height position are corrected to luminance at a single pixel adjacent to the shadow 403 generated on the flat subject 402 and positioned on an outer side of the shadow 403 in the horizontal direction or to an average value for luminance at the predetermined number of pixels adjacent to the shadow 403 generated on the flat subject 402 and positioned on the outer side of the shadow 403 in the horizontal direction. That is, each of the pixels corresponding to the shadow 403 is corrected to the luminance at the pixel(s) outside the shadow 403 at the same height position. According to the foregoing method, since the pixels corresponding to the shadow 403 are corrected to the different luminance depending on the heights, the shadow correction can be more precisely performed as compared to the case where all of the pixels corresponding to the shadow 403 are corrected to the single average value.

Figure 11:
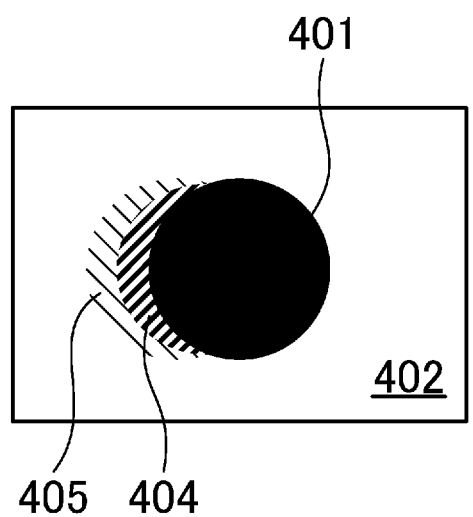
FIG. 11 is a view illustrating a corrected image when a shadow is gradually corrected.

The shadow 403 may be corrected such that the luminance is smoothly changed in the shadow 403. That is, in the foregoing shadow correction, most part of a shadow(s) is removed. On the other hand, the shadow 403 may be corrected such that a correction amount is increased (i.e., the shadow 403 is lightened) away from the subject 401 generating the shadow 403. The following methods may be employed as a method for changing the correction amount: a method in which the correction amount at the pixels corresponding to the shadow 403 is continuously changed depending on the distance from the subject 401; and a method in which, in the state in which the shadow 403 is divided into a plurality of regions depending on the distance from the spherical subject 401, the correction amount is changed for each of the regions. FIG. 11 illustrates the latter method. Referring to FIG. 11, the shadow 403 is divided into an adjacent region 404 relatively close to the subject 401 and a distant region 405 relatively apart from the subject 401. The correction amount in the adjacent region 404 is relatively small, and the correction amount in the distant region 405 is relatively large. In such a manner, a shadow(s) is not completely removed, but can be left in the state in which the shadow(s) appears blurry. As a result, an image can be acquired, which has a picture expression similar to that of an image acquired by shooting for a commercial use by using indirect lighting. Note that the shadow 403 may be divided into not only two regions but also three or more regions. In addition, part of a shadow in the region close to the subject 401 may not be corrected. Even if part of the shadow 403 is not corrected as in the foregoing, the shadow 403 is corrected such that the entirety of the shadow 403 is lightened. This facilitates the correction process, thereby reducing the processing amount.

A shadow(s) is corrected by correcting the luminance, but the method for lightening a shadow(s) is not limited to the foregoing. For example, the color of a shadow(s) may be corrected to lighten the shadow(s). Alternatively, the luminance and color of a shadow(s) may be corrected to lighten the shadow(s). Note that the color of a shadow(s) is corrected so as to be approximate to the color of a region around the shadow(s).

In the foregoing embodiment, it is determined, depending on the distance from the imaging apparatus 100 to part of a subject(s) corresponding to each pixel, whether or not a shadow(s) is corrected, but the present disclosure is not limited to the foregoing. For example, it may be determined, depending on a distance from the imaging apparatus 100 to a representative subject of the entirety of a shot image, whether or not a shadow(s) is corrected. As long as a subject representing a shot image can be determined, the representative subject may be determined by any methods. For example, a salient region may be extracted from a shot image, and may be regarded as the representative subject. Alternatively, a subject positioned at the center of a shot image may be regarded as the representative subject.

It is not necessarily determined, depending on the distance from the imaging apparatus 100 to a subject(s), whether or not a shadow(s) is corrected. That is, regardless of the distance, a shadow(s) may be corrected. This simplifies the shadow correction process.

In the foregoing embodiment, it is determined, depending on the light emission amount of the light emitting part 103, whether or not a shadow(s) is corrected. However, regardless of the light emission amount, a shadow(s) may be corrected. This simplifies the shadow correction process. For example, if the light emission amount of the light emitting part 103 is constant, it is not determined, depending on the light emission amount, whether or not a shadow(s) is corrected.

The imaging apparatus described above is useful in a field of imaging apparatuses requiring the external light emission to compensate for a lack of light.

Various embodiments have been described above as example techniques of the present disclosure, in which the attached drawings and the detailed description are provided.

As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential.

Since the embodiments described above are intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

What is claimed is:

1. An imaging apparatus comprising:
   a light emitting part configured to irradiate a subject with light;
   an imaging part configured to image the subject;
   a distance acquiring part configured to acquire a distance to the subject;
   a shadow estimating part configured to estimate, based on a position of the light emitting part relative to the imaging part and the distance acquired by the distance acquiring part, a shadow generated by the light from the light emitting part in an image shot by the imaging part, by comparing a gradient of a light ray from the light emitting part to each point on the subject with a gradient of a line extending from the light emitting part and tangent to the subject; and
   a shadow correcting part configured to correct the shadow estimated by the shadow estimating part such that the shadow is lightened.

2. The imaging apparatus of claim 1, wherein
the shadow correcting part corrects at least luminance of the shadow.

3. The imaging apparatus of claim 1, wherein
the shadow correcting part corrects luminance of the shadow based on luminance in a region adjacent to the shadow generated on the subject.

4. The imaging apparatus of claim 3, wherein
the shadow correcting part changes the luminance of the shadow to average luminance in a region which has a predetermined range and which is adjacent to the shadow generated on the subject.

5. The imaging apparatus of claim 3, wherein
the shadow correcting part corrects the luminance of the shadow such that the luminance is gradually increased apart from a boundary between the shadow and the subject forming the shadow.

6. The imaging apparatus of claim 1, wherein
the shadow correcting part corrects the shadow when the distance to the subject acquired by the distance acquiring part is equal to or less than a predetermined threshold, and corrects no shadow when the distance exceeds the threshold.

7. The imaging apparatus of claim 1, wherein
the light emitting part is configured such that a light emission amount is adjustable, and
the shadow correcting part corrects the shadow when the light emission amount of the light emitting part is equal to or greater than a predetermined threshold, and corrects no shadow when the light emission amount falls below the threshold.

* * * * *